United States Patent
Rosskopf

[11] Patent Number: 6,145,287
[45] Date of Patent: Nov. 14, 2000

[54] HYDROSTATIC CIRCUIT FOR HARVESTING MACHINE

[75] Inventor: Thomas A. Rosskopf, Panora, Iowa

[73] Assignee: Sauer Inc., Ames, Iowa

[21] Appl. No.: 09/262,220

[22] Filed: Mar. 4, 1999

Related U.S. Application Data

[60] Provisional application No. 60/076,876, Mar. 5, 1998.

[51] Int. Cl.[7] ................................................ A01D 69/00
[52] U.S. Cl. .................................. 56/10.9; 60/489; 60/429
[58] Field of Search ............................. 60/489, 484, 486, 60/429; 56/10.9, 11.9, DIG. 11, 10.8, 11.1, 11.2

[56] References Cited

U.S. PATENT DOCUMENTS

| | | | |
|---|---|---|---|
| 3,659,618 | 5/1972 | Kobald et al. | 130/27 R |
| 3,854,271 | 12/1974 | Aldred | 56/7 |
| 3,922,855 | 12/1975 | Bridwell et al. | |
| 4,023,364 | 5/1977 | Bianchetta | |
| 4,078,681 | 3/1978 | Field, Jr. | |
| 4,140,196 | 2/1979 | Brewer | |
| 4,396,087 | 8/1983 | Rock et al. | |
| 4,561,249 | 12/1985 | Watanabe et al. | 60/421 |
| 4,632,158 | 12/1986 | Haeder et al. | |
| 4,706,445 | 11/1987 | Woolsey | |
| 4,918,918 | 4/1990 | Miki et al. | 60/489 |
| 4,951,469 | 8/1990 | Hayashi et al. | 60/489 |
| 5,446,979 | 9/1995 | Sugiyama et al. | |
| 5,615,553 | 4/1997 | Lourigan | |
| 5,722,190 | 3/1998 | Arnold | |
| 5,946,910 | 9/1999 | Hayashi et al. | 60/421 |

*Primary Examiner*—Robert E. Pezzuto
*Assistant Examiner*—Arpad Fabian Kovacs
*Attorney, Agent, or Firm*—Zarley, McKee, Thomte, Voorhees & Sease

[57] ABSTRACT

The multiple pump apparatus includes first and second variable displacement closed circuit pumps. The multiple pump apparatus pressurizes fluid to be subsequently supplied to drive load devices. The first and second pumps each have fluid communication lines connected to load devices through flow control valves. Each of the pumps has a swashplate for varying its displacement. The swashplates are of the over-center type, enabling each pump to supply pressurized fluid in either direction, thus providing both forward and reverse function to the load devices. The first pump has its fluid communicating lines connected to fluid communicating lines between first and second two-position four-way flow control valves. The opposite side of the first flow control valve has fluid communicating lines connected to a load device which drives a harvesting mechanism, in this case a rotor motor. The opposite side of the second flow control valve has communication lines connected to the circuit for driving the load device for the propel function, in this case, the propel motor(s). In this way, the combined flow from the two pumps enables the vehicle to attain high speed operation for roading without the need for a single large fluid displacement propel pump to support this performance requirement.

5 Claims, 2 Drawing Sheets

HYDROSTATIC CIRCUIT FOR HARVESTING MACHINE

CROSS-REFERENCE TO RELATED APPLICATIONS

This application claims the benefit of U.S. Provisional Application No. 60/076,876 filed Mar. 5, 1998.

BACKGROUND OF THE INVENTION

The present invention relates to the field of hydraulic pumps. More particularly, the invention relates to an apparatus and method for arranging multiple closed circuit variable displacement pumps to support the functions of propel and harvesting on a harvesting machine.

Vehicle propulsion applications of closed circuit variable displacement pumps often require large fluid displacement capacity to support the broad range of torque and speed that is necessary for acceptable performance. Conventional harvesting machines incorporate a dedicated closed circuit variable displacement pump to support the vehicle propulsion function. Additionally, such machines usually incorporate separate closed circuit variable displacement pumps to support other machine functions, such as for example, harvesting mechanisms. It is common on such machines that the harvesting mechanisms are not being utilized when the machine is being driven at high speed conditions, such as roading the machine to and from harvesting locations. Consequently, during these high speed roading or transport conditions, the pumps that are installed on the machine to drive harvesting mechanisms are not being utilized.

It is a primary objective of this invention to utilize the available capacity of the pumps normally dedicated to support harvesting mechanism as supplementary capacity for the vehicle propulsion system during high speed roading operations.

It is a further objective of this invention to reduce the fluid displacement size requirement for the propel pump, thereby reducing the cost, physical size, and drive power requirements for this pump.

Additionally, it is an objective to improve the overall machine efficiency by reducing energy losses and horsepower requirements.

Also, it is an objective to improve the design of such machines by reducing fluid reservoir capacity requirements, and allowing for the accommodation of smaller mounting pads or drive mechanisms for propel pumps.

These and other objectives will be apparent from the drawings, as well as from the description which follows.

SUMMARY OF THE INVENTION

The present invention relates to a multiple pump apparatus including a plurality of closed circuit variable displacement pumps which provide pressurized fluid to drive numerous vehicle functions.

The multiple pump apparatus includes first and second variable displacement closed circuit pumps. The multiple pump apparatus pressurizes fluid to be subsequently supplied to drive load devices. The first and second pumps each have fluid communication lines. The respective lines are connected to load devices through flow control valves. Each of the pumps has a swashplate for varying its displacement. The swashplates are of the over-center type, enabling each pump to supply pressurized fluid in either direction, thus providing both forward and reverse function to the load devices.

The first pump has its fluid communicating lines connected to fluid communicating lines between first and second two-position four-way flow control valves. The opposite side of the first flow control valve has fluid communicating lines connected to a load device which drives a harvesting mechanism, in this case a rotor motor. The opposite side of the second flow control valve has communication lines connected to the circuit for driving the load device for the propel function, in this case, the propel motor(s).

In operation, when the vehicle is operating in the harvesting mode, the flow control valves are positioned so that the two circuits are separate. In the harvesting mode, the pressurized fluid flow from the first pump is directed through the first flow control valve to the first load device, the rotor motor. At the same time, the flow from the first pump is isolated from the propel circuit by the second flow control valve which is in the off or blocked position. Simultaneously, the second pump is providing pressurized fluid flow to the second load device, the propel motor(s).

When the vehicle is operated in the roading mode, wherein the harvesting mechanism is not being utilized, the pressurized fluid flow from the first pump is isolated from the rotor motor by having the first flow control valve in the off or blocked position. The flow from the first pump is directed to the propel circuit through the second flow control valve which is in the on or open position. This flow is combined with the pressurized fluid flow from the second pump and supplied to the propel motor(s). In this way, the combined flow from the two pumps enables the vehicle to attain high speed operation for roading without the need for a single large fluid displacement propel pump to support this performance requirement.

DETAILED DESCRIPTION OF THE PREFERRED EMBODIMENT

Figure 1:
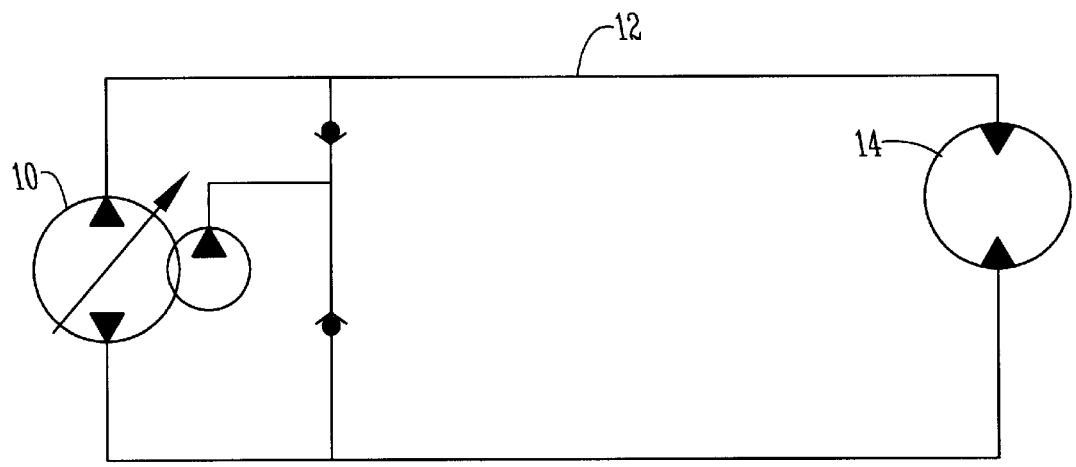
FIG. 1 is a hydraulic schematic diagram depicting the multiple pump system of prior art harvesting machines.
Figure 1:
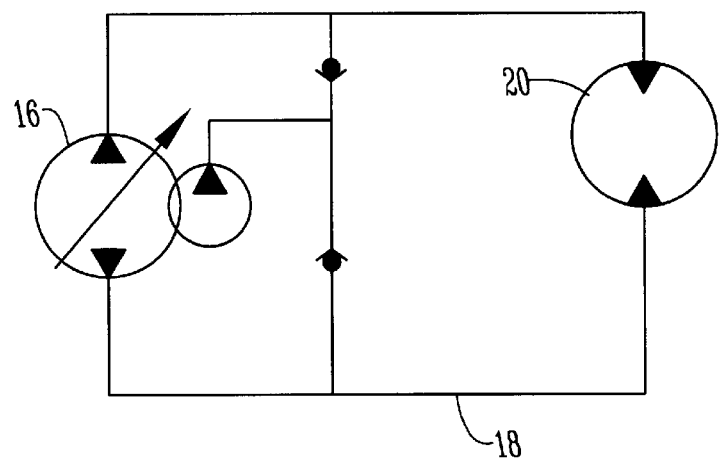

The hydraulic circuit of prior art harvesting machines is shown in FIG. 1. This circuit consists of two separate functional systems, the harvesting circuit, 12 and the propel circuit 18. Harvesting circuit 12 consists of closed circuit variable fluid displacement pump 10 and harvesting mechanism motor 14. In operation, when the harvesting mechanism is required to operate on the vehicle, the vehicle operator signals, either mechanically or electrically for harvesting pump 12 to provide pressurized fluid flow to harvesting mechanism motor 14, to drive the harvesting mechanism. The vehicle operator has the ability to control the operation of the harvesting mechanism by sending the appropriate control signals to the pump 12.

Likewise, the vehicle operator controls the propel function. The propel circuit consist of closed circuit variable fluid displacement pump 16 and propel motor 20. When the vehicle operator wants the vehicle to move, (s)he simply signals the propel pump 16 to provide pressurized fluid to the propel motor 20. As is apparent from this prior art circuit, the harvesting and propel circuits are completely separate. As such, the pressurized flow from the respective pumps 10 and 16 are only available to their respective motors 14 and 20. In this configuration, each pump must be sized to adequately support whatever performance is desired for both torque and speed requirements. Consequently, especially regarding the propel pump 16, if high vehicle speed is desired, a large fluid displacement pump must be provided, because no other source of pressurized fluid flow is available to support this function.

Figure 2:
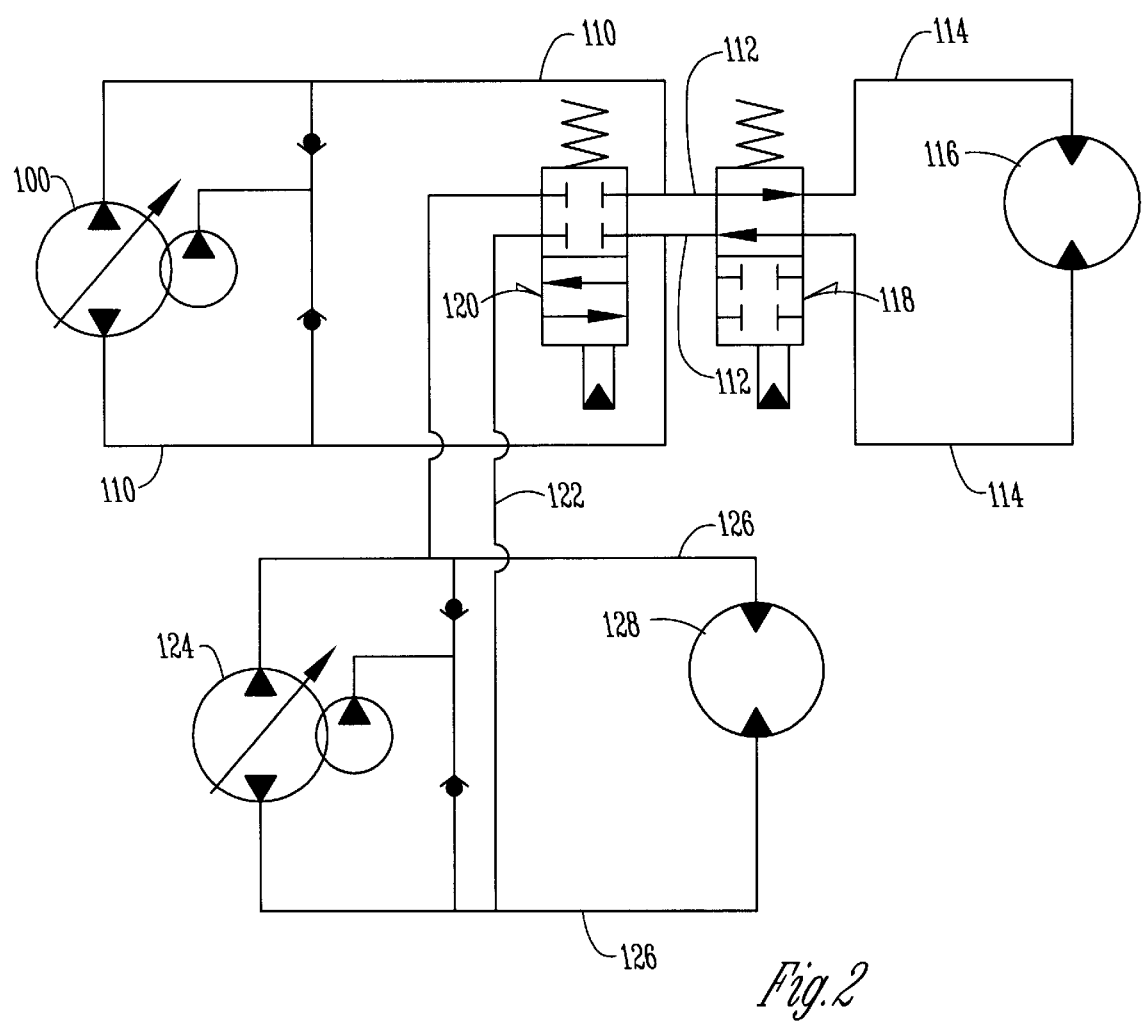
FIG. 2 is a hydraulic schematic diagram depicting the multiple pump system of the present invention showing the configuration for selectively separating or combining the output of the closed circuit variable displacement pumps.

FIG. 2 shows the circuit diagram of the present invention. The harvesting circuit in this diagram consists primarily of closed circuit variable fluid displacement pump 100 and harvesting mechanism motor 116. Added to this circuit are flow control valves 118 and 120. With this arrangement, when the vehicle operator needs harvesting function, a signal is sent to pump 100 to provide pressurized fluid flow to motor 116. In order for the fluid flow from pump 100 to reach motor 116, flow control valve 118 is activated to the terminal spool position shown in FIG. 2, whereby the flow through lines 110 is communicated through lines 112 and subsequently lines 114 to motor 116. Simultaneously, flow control valve 120 is activated to the terminal spool position shown in FIG. 2, whereby any flow from pump 100 through lines 110 and lines 112 is blocked from being communicated to lines 122 and subsequently to the propel circuit.

Also shown on FIG. 2 is the propel circuit which consists primarily of closed circuit variable fluid displacement pump 124 and propel motor 128. When propel function is required during harvesting operation, the vehicle operator signals propel pump 124 to provide pressurized fluid flow through lines 126 to propel motor 128. In the harvesting mode, only fluid flow from pump 124 is available to drive propel motor 128, since any flow from pump 100 is blocked at flow control valve 120.

When the vehicle is not in the harvesting mode, and may be transported to another location, the harvesting pump 100 is not required to supply fluid flow to the motor 116. In the transport mode, flow control valve 112 is actuated into the opposite terminal spool position whereby any flow from pump 100 is blocked from communication with motor 116. Simultaneously, flow control valve 120 is actuated into its opposite terminal spool position, which allows any flow from pump 100 to be communicated through lines 122 to the propel circuit, thereby being combinable with flow from pump 124 to motor 128. In this manner, the combined flow of pumps 100 and 124 can be utilized to support the propel function. In this manner, it is not necessary to provide a single large fluid displacement pump in the propel circuit to achieve high vehicle speed for transport.

Therefore, it can be seen that the invention at least accomplishes its stated objectives.

What is claimed is:

1. A crop harvesting machine having first and second hydraulic drive mechanisms to propel the machine, and to operate crop harvesting components, respectively, comprising:

said machine including first and second closed circuit variable fluid displacement pumps, a hydraulic propel motor, and a hydraulic harvesting motor, first and second flow control valves interposed in a hydraulic circuit containing said pumps and said motors and capable of controlling fluid flow from said pumps to said motors, said valves being movable between open and closed positions so that said pumps can both supply hydraulic fluid to only said propel motor when said machine is only in a propel mode, and so that when machine is in both a propel mode and a harvesting mode, only said first valve can supply hydraulic fluid to said propel motor and only said second motor can supply fluid to said harvesting valve.

2. The machine of claim 1 wherein said hydraulic circuit is comprised of propel and harvesting circuits, said propel circuit including said first pump and said propel motor; said harvest circuit including said second pump and said harvesting motor, with said valves being interposed in said hydraulic circuit between said propel and harvesting circuits.

3. A crop harvesting machine having first and second hydraulic drive mechanisms to propel the machine, and to operate crop harvesting components, respectively, comprising:

said machine including first and second closed circuit variable fluid displacement pumps, a hydraulic propel motor, and a hydraulic harvesting motor, first and second flow control valves interposed in a hydraulic circuit containing said pumps and said motors and capable of controlling fluid flow from said pumps to said motors, said valves being movable between open and closed positions so that said pumps can both supply hydraulic fluid to only said propel mode, and so that when machine is in both a propel mode and a harvesting mode, only said first valve can supply hydraulic fluid to said propel motor and only said second valve can supply fluid to said harvesting motor;

said valves being two-position four-way flow control valves.

4. A crop harvesting machine having first and second hydraulic drive mechanisms to propel the machine, and to operate crop harvesting components, respectively, comprising:

said machine including first and second closed circuit variable fluid displacement pumps, a hydraulic propel motor, and a hydraulic harvesting motor, a control system consisting essentially of first and second flow control valves interposed in a hydraulic circuit containing said pumps and said motors and capable of controlling fluid flow from said pumps to said motors, said valves being movable between open and closed positions so that said pumps can both supply hydraulic fluid to only said propel mode, and so that when machine is in both a propel mode and a harvesting mode, only said first valve can supply hydraulic fluid to said propel motor and only said second valve can supply fluid to said harvesting motor;

said valves being 2-position 4-way flow control valves.

5. The machine of claim 4 wherein the hydraulic harvesting motor is a rotor motor.

* * * * *

UNITED STATES PATENT AND TRADEMARK OFFICE
CERTIFICATE OF CORRECTION

PATENT NO. : 6,145,287
DATED : November 14, 2000
INVENTOR(S) : Thomas A. Rosskopf It is certified that error appears in the above—identified patent and that said Letters Patent are hereby corrected as shown below:

Column 4, line 9, strike the second word "motor" and insert the word -- valve --.

Signed and Sealed this

First Day of May, 2001

Attest:

NICHOLAS P. GODICI

Attesting Officer

Acting Director of the United States Patent and Trademark Office